United States Patent
Noordam et al.

(10) Patent No.: US 10,653,076 B2
(45) Date of Patent: May 19, 2020

(54) METHOD FOR THE CULTIVATION OF PLANTS USING A CARRIER WITH A REMOVABLE SIDE SUPPORT STRUCTURE ARRANGED THEREON

(71) Applicant: Cultivation Systems B.V., The Hague (NL)

(72) Inventors: Christiaan Silvester Noordam, Schipluiden (NL); Maurice Cornelis Antonius van der Knaap, The Hague (NL)

(73) Assignee: Cultivation Systems B.V., The Hague (NL)

( * ) Notice: Subject to any disclaimer, the term of this patent is extended or adjusted under 35 U.S.C. 154(b) by 410 days.

(21) Appl. No.: 15/325,093

(22) PCT Filed: Jul. 8, 2015

(86) PCT No.: PCT/NL2015/050499
§ 371 (c)(1),
(2) Date: Jan. 10, 2017

(87) PCT Pub. No.: WO2016/007005
PCT Pub. Date: Jan. 14, 2016

(65) Prior Publication Data
US 2017/0164565 A1    Jun. 15, 2017

(30) Foreign Application Priority Data

Jul. 10, 2014 (NL) ..................................... 2013161

(51) Int. Cl.
*A01G 9/04* (2006.01)
*A01G 9/029* (2018.01)
(Continued)

(52) U.S. Cl.
CPC ........... *A01G 9/045* (2013.01); *A01G 9/0295* (2018.02); *A01G 31/02* (2013.01); *A01G 2009/003* (2013.01)

(58) Field of Classification Search
CPC .... A01G 9/029; A01G 9/0293; A01G 9/0295; A01G 9/0297; A01G 9/0299;
(Continued)

(56) References Cited

U.S. PATENT DOCUMENTS

| 4,329,812 A | 5/1982 | Carlisle |
| 4,513,533 A | 4/1985 | Gething |

(Continued)

FOREIGN PATENT DOCUMENTS

| CN | 201700202 | 1/2011 |
| CN | 201995394 | 10/2011 |

(Continued)

*Primary Examiner* — Christopher D Hutchens
(74) *Attorney, Agent, or Firm* — N.V. Nederlandsch Octrooibureau; Catherine A. Shultz; Tamara C. Stegmann

(57) ABSTRACT

The invention relates to a method for the cultivation of a number of plants (9), comprising providing a carrier with apertures for said plants (3, 13) and providing a water supply (8), wherein said carrier can be provided on said water supply in a floating manner and wherein a growth medium containing the roots of said plant or the precursor thereof are placed in an air-containing intermediate space (10) in the apertures in said carrier at such a distance from said water supply that said roots of said plant or the precursor thereof are situated at a vertical distance (a) from said water supply, wherein at least two horizontally opposing sides of an upper part of the growth medium are sideways supported along a height (h) by corresponding sides of a removable side support structure (18), removably arranged on top of the carrier.

14 Claims, 5 Drawing Sheets

(51) Int. Cl.
*A01G 31/02* (2006.01)
*A01G 9/00* (2018.01)

(58) Field of Classification Search
CPC ........ A01G 9/045; A01G 27/02; A01G 27/06; A01G 31/02; A01G 2009/003
USPC .................................................. 47/66.7, 73
See application file for complete search history.

(56) References Cited

U.S. PATENT DOCUMENTS

| | | |
|---|---|---|
| 4,669,217 A | 6/1987 | Fraze |
| 4,982,527 A | 1/1991 | Sprung |
| 5,172,516 A | 12/1992 | Maillefer |
| 5,261,185 A | 11/1993 | Koide et al. |
| 5,324,657 A | 6/1994 | Tanny |
| 5,435,098 A | 7/1995 | Koide et al. |
| 5,657,577 A | 8/1997 | Rodder |
| 5,799,440 A | 9/1998 | Ishikawa et al. |
| 5,855,091 A | 1/1999 | Santoiemmo |
| 6,134,834 A | 10/2000 | Ripley, Sr. et al. |
| 6,405,481 B1 * | 6/2002 | Bautner ............... A01G 9/0295 47/77 |
| 6,678,997 B1 | 1/2004 | Howe |
| D571,024 S | 6/2008 | Lee |
| 7,716,873 B2 | 5/2010 | Irwin |
| 7,845,114 B2 | 12/2010 | Kirtz et al. |
| 8,122,682 B2 | 2/2012 | Mischo |
| 2004/0255513 A1 | 12/2004 | Becker |
| 2008/0120903 A1 * | 5/2008 | Fair ...................... A01G 9/0295 47/65.7 |
| 2010/0180500 A1 * | 7/2010 | Visser ................... A01G 9/086 47/86 |
| 2011/0232183 A1 * | 9/2011 | Chang .................. A01G 9/0295 47/65.9 |
| 2014/0259910 A1 * | 9/2014 | Dunn ..................... A01G 9/02 47/65.5 |
| 2016/0270310 A1 * | 9/2016 | Botman ................. A01G 22/00 |

FOREIGN PATENT DOCUMENTS

| | | |
|---|---|---|
| CN | 203233778 | 10/2013 |
| CN | 203661703 | 6/2014 |
| EP | 0052264 A1 | 5/1982 |
| EP | 0804873 A1 | 11/1997 |
| EP | 2681989 A1 | 1/2014 |
| GB | 1229337 A | 4/1971 |

* cited by examiner

METHOD FOR THE CULTIVATION OF PLANTS USING A CARRIER WITH A REMOVABLE SIDE SUPPORT STRUCTURE ARRANGED THEREON

FIELD OF THE INVENTION

The present invention relates to a method for the cultivation of a number of plants, comprising providing a carrier with apertures for said plants and providing a water supply, wherein a growth medium containing the roots of said plant or the precursor thereof are placed in the apertures in said carrier in an air-containing intermediate space at such a distance from said water supply that said roots of said plant or the precursor thereof are situated at a vertical distance from said water supply.

BACKGROUND OF THE INVENTION

Such a method for cultivating plants is known from for instance WO2010/093248 by the present applicant. This publication describes a method for the floating cultivation of plants, wherein the growth medium is kept at a vertical distance from the water surface at all times, to prevent rotting of the roots and in general to allow the plant to develop a strong root system, in particular comprising air roots. The content of the above patent publication is hereby incorporated by reference in the present patent application.

However, the inventors have realized that after the plant has grown considerably in the growth medium, it becomes increasingly hard to grip the growth medium with the plant from below or from above: when gripping the grown plant from above the leaves of the crop may be damaged, whereas, when gripping the plant from below the root system may become damaged. Especially when using automated gripping means to grip the growth media, for instance to increase plant spacing, plant or root damage is a common occurrence. Use of specialized plant pots, wrapping papers and the like in practice proves to be too costly to solve this problem effectively.

It is an object of the present invention to optimize the prior-art method by allowing gripping of the growth medium without damaging the leaves or the roots of the crop.

This object is achieved by the method as described by claim 1.

SUMMARY OF THE INVENTION

According to the present invention, a method for the cultivation of a number of plants is provided, comprising providing a carrier with apertures for said plants and providing a water supply, wherein,
  in a preparatory stage a growth medium is arranged in the apertures, wherein at least two horizontally opposing sides of an upper part of the growth medium are sideways supported along a height by corresponding sides of a removable side support structure, removably arranged on top of the carrier, and the roots of the plant or a precursor thereof is placed in the growth medium, wherein,
  in a first stage of growth of said plant or the precursor thereof, said carrier is provided on said water supply, and said plant or the precursor thereof is positioned at such a distance from said water supply that said roots of said plant or the precursor thereof are situated at a vertical distance from said water supply, at least a significant part of the requirement for moisture of said plant or the precursor thereof is satisfied by an intermediate space between said carrier and said water supply and/or by said carrier, wherein said first stage of growth comprises at least a few days, wherein,
  in a second, further stage of growth of said plant, at least 90% of the moisture requirement of said plant is satisfied directly by said water supply,
  wherein, after the arranging of the growth medium in the aperture of the carrier, the removable side support structure is removed from the carrier such that the at least two opposing sides of the upper part of the growth medium are exposed and, such as before the second stage of growth, the growth medium can be gripped sideways at the opposing sides, such as by gripping means, to lift the growth medium along with the plant from the aperture for increasing the horizontal distance between said plants.

The skilled person will understand that already during the filling of the apertures with growth media (such as a lump or ball of soil) or the arranging of growth media into the apertures, the removable side support structure must be in place.

The inventors have shown the insight that gripping the (bare) growth medium from aside proves to be the best way of engaging the growth medium, for example for increasing plant spacing. However, the horizontal sides of the growth medium are usually contained within the aperture and are therefore next to impossible to engage. The removable side support structure is to be placed on the carrier preferably before the growth medium with the plant or the precursor thereof is arranged into the respective aperture in the carrier. The skilled person will understand that the growth medium will be usually placed in the aperture first, i.e. without the plant or the precursor being contained in the growth medium. The removable side support structure basically takes over the role of providing sideways support to the bare growth medium, for instance otherwise provided by a conventional plant pot. The removable side structure is preferably removably attached to the carrier by some form of attachment means, for instance a snapfit.

By removing the removable side support structure from the carrier before the second stage of growth, such that the at least two opposing sides of the upper part of the growth medium are exposed, the growth medium can be gripped sideways at the opposing sides by gripping means to lift the growth medium along with the plant from the aperture, for instance to increase plant spacing. Preferably, the removable side support structure is removed even before the plant or the precursor thereof is placed in the growth medium, i.e. when the growth medium itself has gained sufficient cohesive strength to be able to go without the removable side support structure.

The carrier can be provided on the water supply in a floating manner, wherein the carrier can be constructed to float by itself or can be provided with a floatable body to facilitate floating. The aforementioned vertical distance preferably is 1-10 cm, more preferably 1-5 cm.

Another aspect of the invention concerns an assembly of a panel-shaped carrier and a removable side support structure, removably arranged on top of the carrier, the carrier having apertures for plants, wherein a growth medium, either or not containing the roots of a plant or the precursor thereof, is placed in the apertures in said carrier, wherein at least two horizontally opposing sides of an upper part of the growth medium are sideways supported along a height by corresponding sides of the removable side support structure, such as opposing sides of a vertical through-hole provided in the removable side support structure. The carrier can be constructed to float by itself or can be provided with a further floatable body for the floating cultivation of plants.

An embodiment relates to an aforementioned assembly, wherein, in top view, the removable support structure has a shape and outer dimensions identical to the shape and outer dimensions of the carrier. Thus, a compact package is achieved that can be handled with ease.

Preferably, when seen in top view, the apertures of the carrier are arranged in a pattern comprising a plurality of parallel rows, each row in a row direction having a row length of multiple apertures.

The removable side support structure is preferably formed as one integral element. This single, integral element can thus be placed on the carrier and removed therefrom in a single step.

In an embodiment, the removable side support structure has a plate-like shape. The height of the plate-like shape, in the position of use, preferably at least equals the height (h) of the growth medium sides to be supported.

The carrier may comprise upward protrusions positioned between adjacent apertures in a row to sideways support horizontally opposing sides, opposing in the row direction, of the upper part of the growth medium, in such a way that the growth medium is sideways supported, and enclosed by, the combination of protrusions and the removable side support structure. Thus, an assembly resembling a common plant tray may be obtained, and may be treated/handled as such.

The removable side support structure may therein comprise horizontal, elongated segments, extending in the row direction, to fill up the space between adjacent rows of growth media. The elongated segments then preferably provide sideways support to both growth media in one row as well as growth media in the adjacent row. The height of the elongated segments, in the position of use, preferably at least equals the height (h) of the growth medium sides to be supported. After removal of the side support structure, the elongated "gaps" left in the row direction by the elongate segments can be used advantageously for the back and forth moving of (automated) gripping means. In addition to the above, the complete sideways enclosure of the growth medium by the protrusions and the removable side support structure prevents excessive drying thereof. Instead of protrusions, similar bodies or objects may be used, formed integrally with the carrier or being separately formed therefrom.

Another embodiment relates to an aforementioned assembly, wherein, when seen in top view, the removable side support structure has a pattern of apertures in the form of through-holes matching the pattern of the apertures of the carrier, the through-holes having a vertical through-hole length at least equal to the height (h). The circumference of the through-holes may be circular, rectangular, square, et cetera. The same goes for the apertures in the carrier.

Most preferably, the growth medium is self-adhesive. As stated, a plant pot, container, wrapping paper or the like, brings additional costs. It is therefore crucial that the growth medium, according to the invention being essentially free from a "permanent outer enclosure", or wrapping/housing, has sufficient adhesive strength by itself. Thereto, compressed soil can be used, for instance, or soil with additives, such as glue additives, to enhance the adhesive properties of the growth medium. Such soil will be arranged in the aperture before the first stage of growth, thereafter the removable side support structure is removed and the soil is subsequently allowed to dry, such that sufficient adhesive strength is achieved when the growth medium along with the plant are transferred from the first stage of growth to the second stage of growth.

The growth medium may typically have an outer width, length or height (or combinations thereof) of between 2-7 cm, in particular 5 cm. Preferably the through-holes in the removable side support structure and/or the apertures are shaped as the provide the horizontally opposing sides of the growth medium with an angle of 0-15°, such as 7°, with respect to the vertical to facilitate the method step related to the increasing of plant spacing. The height (h) may for instance amount to about 30-70%, such as about 50%, of the height of the growth medium.

The carrier as well as the removable side support structure preferably have outer dimensions comprising a length of 20-60 cm, a width of 40-80 cm, a height of 1-10 cm, more preferably a length of about 40 cm, a width of about 60 cm and a height of about 3-8 cm, such as 5 cm. However, larger dimensions are also conceivable.

The invention also relates to a system comprising a water supply, filled with water, wherein an aforementioned assembly is provided on or above said water supply, such as by floating on the water supply, wherein in a first stage of growth the plant or the precursor thereof is positioned at such a distance from said water supply that said roots of said plant or the precursor thereof are situated at a vertical distance from said water supply, wherein at least a significant part of the requirement for moisture of said plant or the precursor thereof is satisfied by an intermediate between said carrier (3, 13) and said water supply and/or by said carrier.

European patent publication EP 2.681.989 A1 describes a roof module for creating a so-called 'green roof'. Such a 'green roof' comprises soil and plants to improve the insulation of the respective building, and to give a 'green' appearance to the building. EP 2.681.989 A1 proposes to position multiple roof modules next to each other in rows to form such a 'green roof'. Such a roof module is provided with an edge strip that can be torn off. The edge strip provides sideways support to a growth medium. After placing the roof modules next to each other, the edge strip can be torn off via a respective tearing line. This patent publication, however, only discloses the strip to be arranged at the circumference of a roof module. It does not disclose the strip to be able to give sideways support to each individual growth medium.

British patent publication GB 1.229.337 A describes a combined tray for receiving growth medium and a covering plate to allow seeds to germinate in the growth medium.

BRIEF DESCRIPTION OF THE DRAWINGS

The invention will be described in more detail below with reference to an exemplary embodiment illustrated in the drawing, in which.

DETAILED DESCRIPTION

Figure 1:
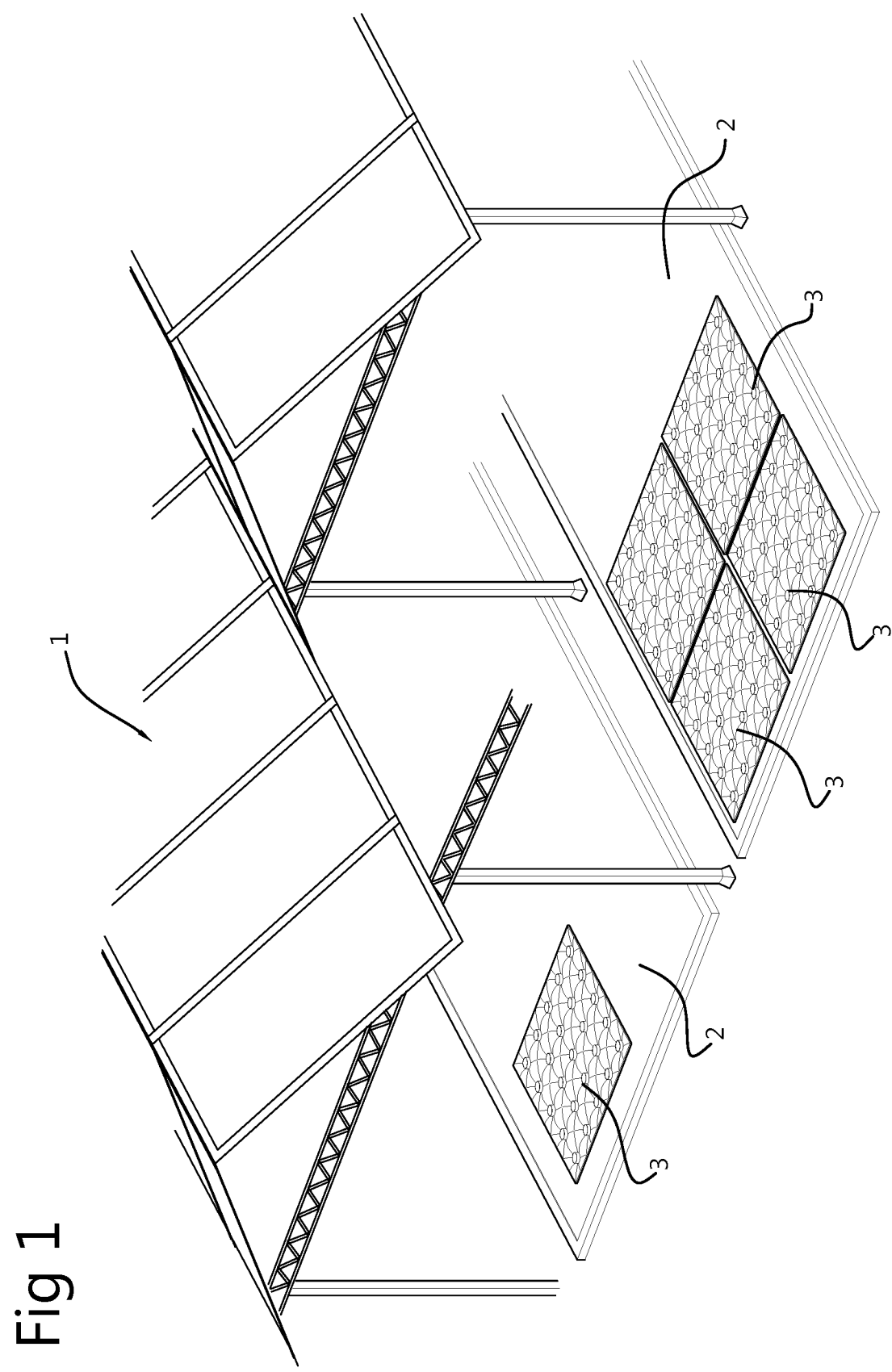
FIG. 1 diagrammatically shows a perspective view of a cultivation space provided with a number of floats or panels, according to the prior art.
Figure 4:
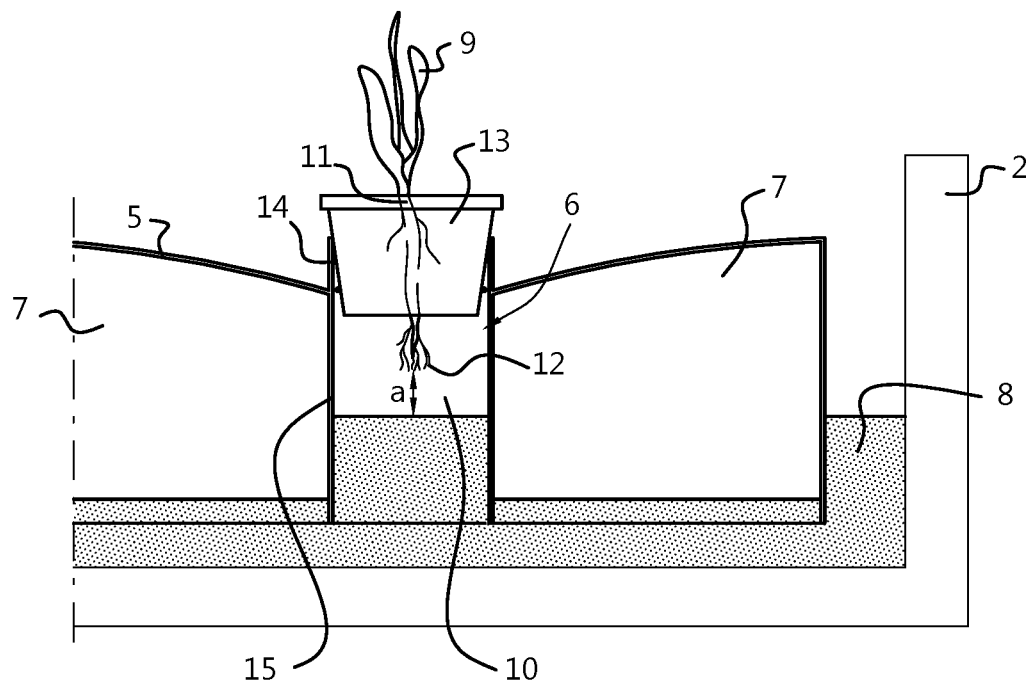
FIG. 4 diagrammatically shows a detail of the prior art panel in cross section with a developing plant in a first stage of growth.

In FIG. 1, reference numeral 1 denotes a prior art cultivation space which accommodates the floats or plates 3 according to the prior art in a water-filled basin 2. The cultivation space is shown here as a greenhouse, but it should be understood that any kind of cultivation space can be used, optionally provided with natural and artificial lighting. It is likewise possible to place the basin 2 with floats 3 in the open air. Basin 2 is filled with water on which the floats 3 float. The water level is indicated in FIG. 4 by reference numeral 8. By means of such a structure, the climate for the plant can be optimized and it is also possible to simplify the logistics in a cultivation space. One or more floats or panels can be moved in a basin and, for example, moved to a processing space or to another basin, depending on the development of the crop and/or on whether certain parts thereof have already been harvested.

Figure 2:
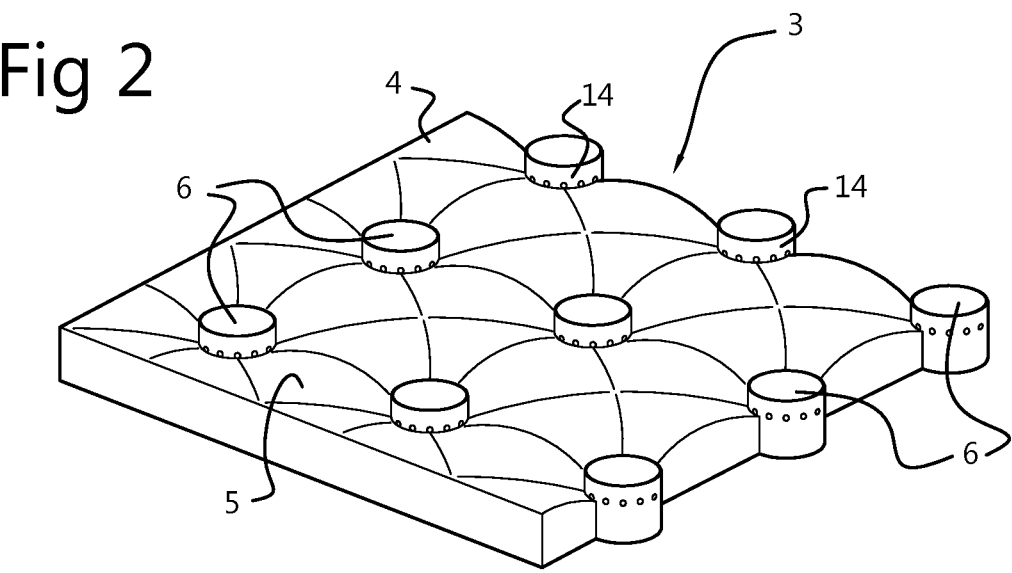
FIG. 2 shows the top side of a prior art panel in perspective.
Figure 3:
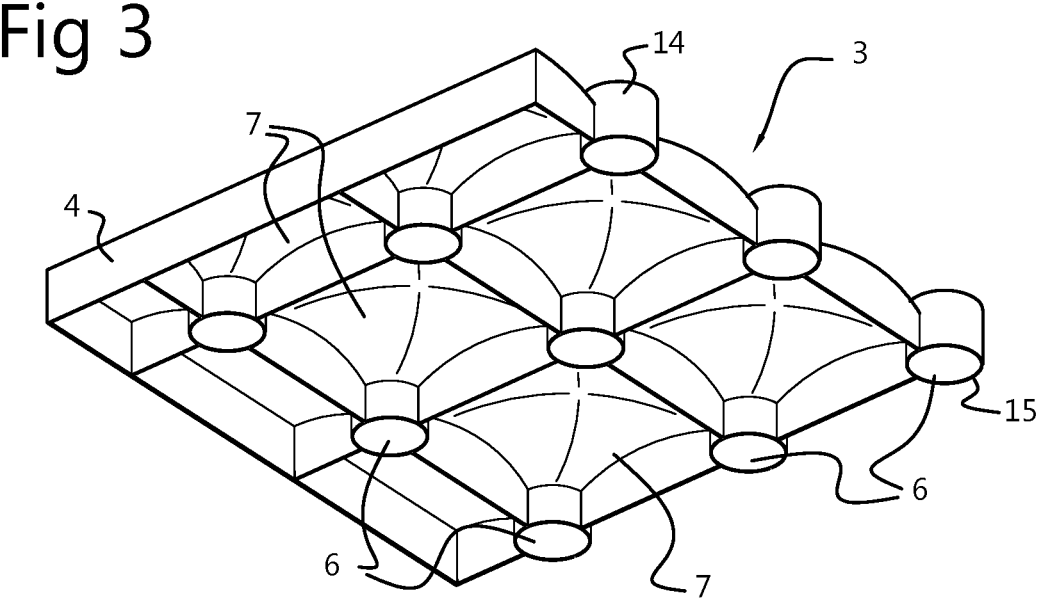
FIG. 3 shows the bottom side of the prior art panel shown in FIG. 2.
Figure 5:
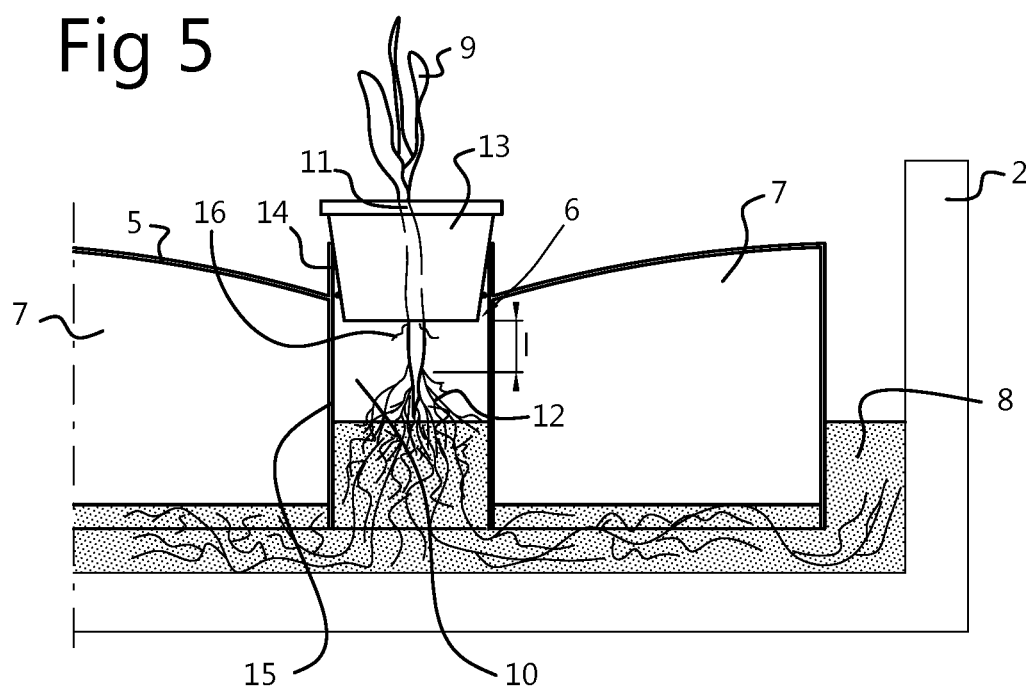
FIG. 5 shows the detail from FIG. 4 in a second stage of growth of the plant.

FIG. 2 shows a detail of a float or panel 3 according to the prior art, i.e. without the removable side support structure according to the invention being arranged thereon. This consists of a body material which, in the present exemplary embodiment, is preferably a foam material made from hard plastic, such as for example a polystyrene material. However, it is also possible to produce it from another material or combination of different parts. As can be seen in FIG. 2, the top surface, which is denoted by reference numeral 5, is of a design which is curved in such a manner that water which is present thereon flows away into the basin. Thus, no water will remain on the upper surface 5 of the float or panel. Continuous apertures or holes 6 are provided in the float or panel. FIGS. 2 and 4, 5 show that these are provided with a vertical edge 14 which is raised with respect to the direct surroundings of the upper surface 5 of the panel. FIG. 3 shows details of the bottom side of the panel and it can be seen that it is provided with a number of chambers 7 which are gas-tight towards the top and open towards the bottom.

In FIGS. 4 and 5, it can be seen that, on the one hand due to the buoyancy of the body 4 and, on the other hand, due to the volume of gas caught in the chambers 7, the panel or float 3 floats on the water 8. Due to the latter fact, fewer or no requirements are imposed on the buoyancy of the material of the body 4 (see FIGS. 2 and 3). The length of the holes 6 is such that, on the bottom side, they extend up to and preferably into the water. Thus, a number of protected spaces are created for the plant which is denoted by reference numeral 9 in FIGS. 4 and 5.

In this prior art example, this plant is accommodated in a container 13 and the root system thereof consists of a root neck 11 and the actual roots 12 originating therefrom. These are situated inside the tubular space 10 of hole 6. Inside this space, which is delimited by tube 15, a microclimate exists which has a positive effect on the development of the root system.

During the first stage of growth illustrated in FIG. 4, the root system is at a distance a from the water surface 8. It has been found that, due to this microclimate, the plant develops downwards. It is assumed that as a result of the relatively low moisture content in the space between the water level 8 and the bottom side of the carrier, that is to say intermediate space 10, compared to the known systems, the roots strive to reach the water level 8 as quickly as possible. In any case, it has been found that the roots develop particularly quickly in the downward direction, starting from the root neck 11.

This development is illustrated in FIG. 5 and shows the results which are achieved after only a few days. The length of the actual root which is situated in the air, that is to say the intermediate space, is denoted by reference 1 and is smaller than the height of the intermediate space, that is to say there is no contact with the water. This length varies depending on the way in which growing takes place. In the present example, a substrate is used and the length is defined as the part which is below the substrate. If no substrate is used, the length is that part which extends directly below the root neck itself. This part can grow in a few days.

It has been found that the space in which the root system develops has an optimum climate which is particularly rich in oxygen.

The prior art as well as the present invention seek to provide a combination of preferably aeroponic and hydroponic cultivation. That is to say that during the first stage of growth, the largest part of the water requirement of the developing plant is supplied by the environment, that is to say the air or the substrate. Only during the second stage of growth is the largest part of the of the water requirement satisfied by the water supply.

The water supply will preferably be kept in motion in order to prevent the development of unwanted diseases and the like. In addition, fertilizers can be supplied continuously, depending on the development of the plant. In the space which is situated below the root neck and above the water level, (air) roots 16 may be formed.

Figure 6:
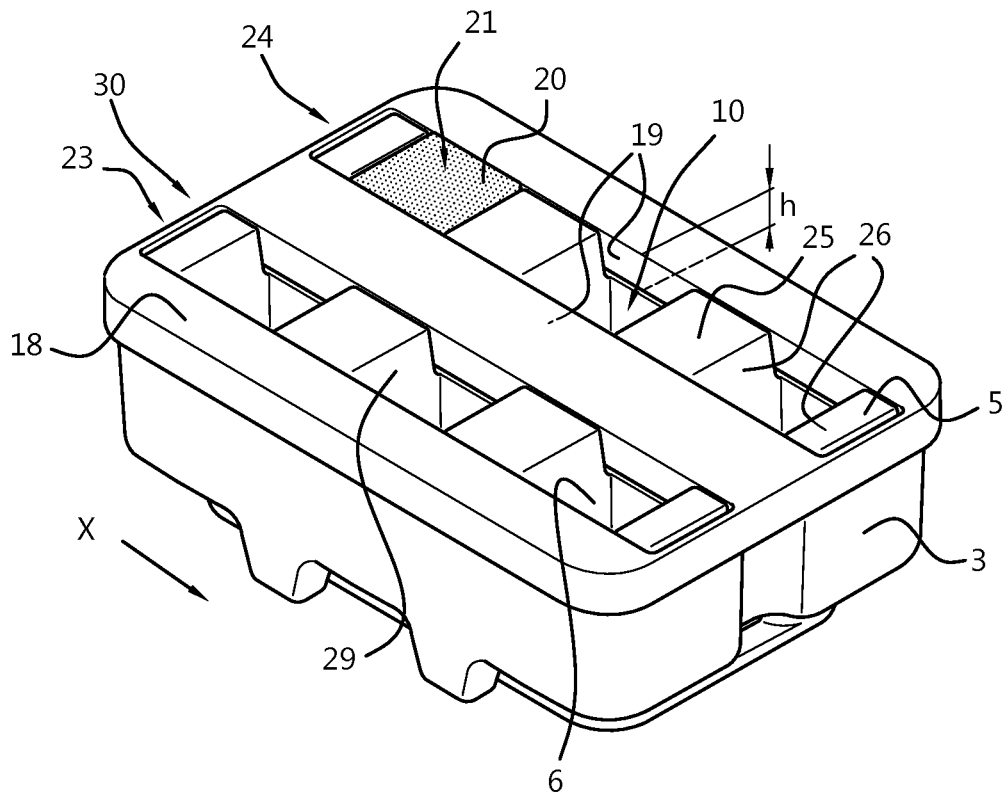
FIG. 6 shows an assembly of a carrier and a removable side support structure according to the invention.

FIG. 6 shows an assembly 23 of a carrier 3 and a removable side support structure 18 according to the invention. The removable side support structure 18 is removably arranged on top of the float or carrier 3, wherein the carrier 3 may have buoyancy for the floating cultivation of plants or can be provided with a floatable body. The carrier 3 may also be held in position by fixed holding means (not shown), i.e. the carrier 3 is held in fixed position with respect to the water supply. The carrier 3 has a grid of apertures 6 for said plants. The carrier 3 can be provided on a water supply in a floating manner. A growth medium 21 containing the roots of a plant or the precursor thereof is placed in an air-containing intermediate space 10 in the apertures 6 in said carrier 3 at such a distance from said water supply that said roots of said plant or the precursor thereof are situated at a vertical distance (a) from said water supply. According to the invention, at least two horizontally opposing sides 19 of an upper part 20 of the growth medium 21 are sideways supported along a height (h) by corresponding sides 29 of the removable side support structure 18. The opposing sides 19 of the growth medium 21 as well as the sides 29 of the removable support structure 18 will normally extend in a substantially vertical direction, i.e. in a substantially vertical plane, during the position of use.

As shown in FIG. 6, the removable support structure 18 has a shape and outer dimensions identical to the shape and outer dimensions of the carrier 3. When seen in top view, the apertures 6 of the carrier 3 are arranged in a pattern comprising a plurality of parallel rows 24, each row 24 in a row direction X having a row length of multiple apertures, such as 3. The removable side support structure 18 is formed as one integral element, for instance made of plastic, for example in a single injection moulding step. The removable side support structure 18 has a plate-like shape.

However, it is conceivable that, instead of the removable side structure being formed as one integral element, multiple removable elongated strips are used to support the at least two opposing sides of the growth medium. The multiple elongated strips may be interconnected in some way if desired.

The carrier as shown comprises upward protrusions 25 positioned between adjacent apertures 6 in a row 24 to sideways support horizontally opposing sides 26, i.e. opposing in the row direction X, of the upper part 20 of the growth medium 21, in such a way that the growth medium 21 is sideways supported, and enclosed by, the combination of protrusions 25 and by corresponding sides 29 of the removable side support structure 18.

In this respect, it is furthermore conceivable that, instead of the removable side support structure 18 being a "static" structure, statically arranged on the carrier 3, a moveable side support structure 18 is used to provide sideways support to the growth medium 21, at least during the arranging of the growth medium 21 in the aperture 6 of the carrier 3. In this respect "moveable" means moveable relative to the carrier 3, especially in a horizontal plane or direction, in particular along the top surface of the carrier 3.

The carrier 3 (by itself) may for instance be transported on a conveyor system (not shown) in a horizontal direction into a filling zone of the conveyor system provided with (static) elongated members (not shown) extending in the row direction X, the elongated members being configured to fit accurately between adjacent rows 24 and having a length at least equal to the row length. When the carrier 3 is moved sufficiently far into the filling zone and the elongated members are positioned between the adjacent rows 24, along the whole length of the adjacent rows 24, the growth media 21 can be arranged in the apertures 6 of the carrier 3. The sides of the elongated members then provide sideways support to the opposing sides 19 of the growth medium 21 during the filling process. The protrusions 25 are still required to provide sideways support to the other sides 26 of the growth medium 21 not supported by the elongated members. After all the apertures 6 have been filled with growth medium 21, the conveyor is activated again and the carrier 3 is moved in the row direction X again (along the length of the elongated members) out of the filling zone. This last step basically constitutes the removal of the removable side support structure 18.

When seen in top view, the assembly 23 of the carrier 3 and the removable side support structure 18 show a pattern, for instance a grid-like pattern, of apertures in the form of through-holes 30, for instance square, rectangular or circular through-holes, matching the pattern of the apertures 6 of the carrier 3, the through-holes 30 having a vertical through-hole length at least equal to the height (h).

Prior to arranging the assembly 23 on the water-basin, such as by floating or by arranging the assembly 23 at a fixed distance from the water basin, the growth media 21 may be supported from below by a support plate 28 having upward protrusions 27, preferably conically shaped, on which the growth media 21 initially rest. Each air-containing space 10 preferably comprises such a protrusion 27.

Figure 7:
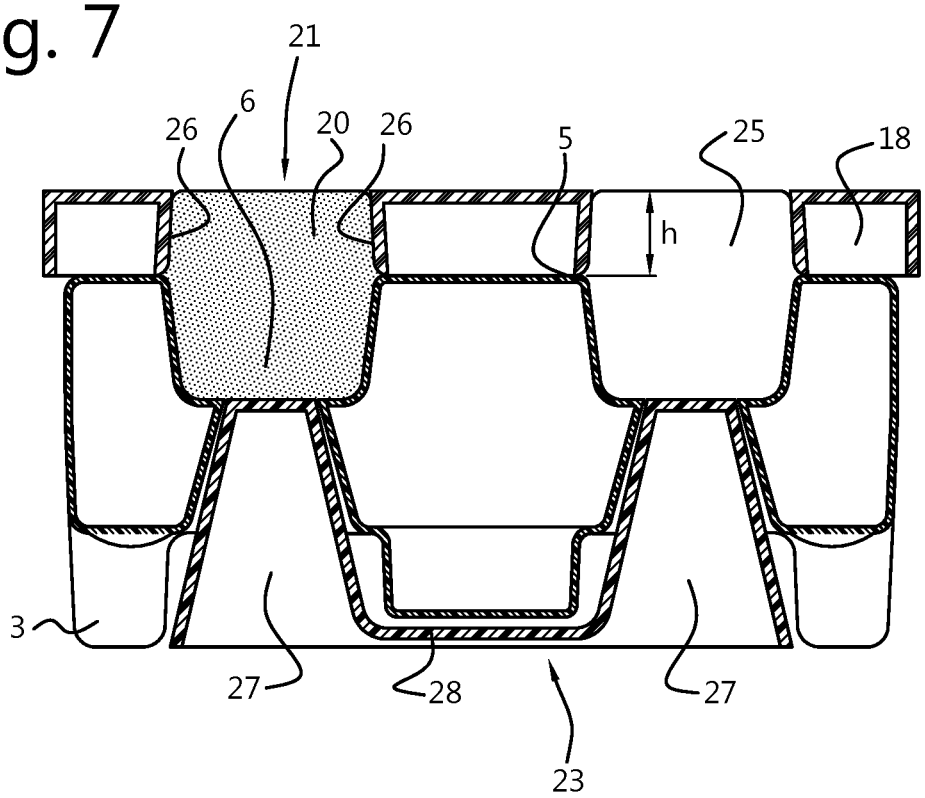
FIG. 7 shows a cross-section of the embodiment of FIG. 6 in a vertical plane along the length of the assembly.

FIG. 7 shows a cross-section of the embodiment of FIG. 6 in a vertical plane along the length of the assembly 23.

Figure 8:
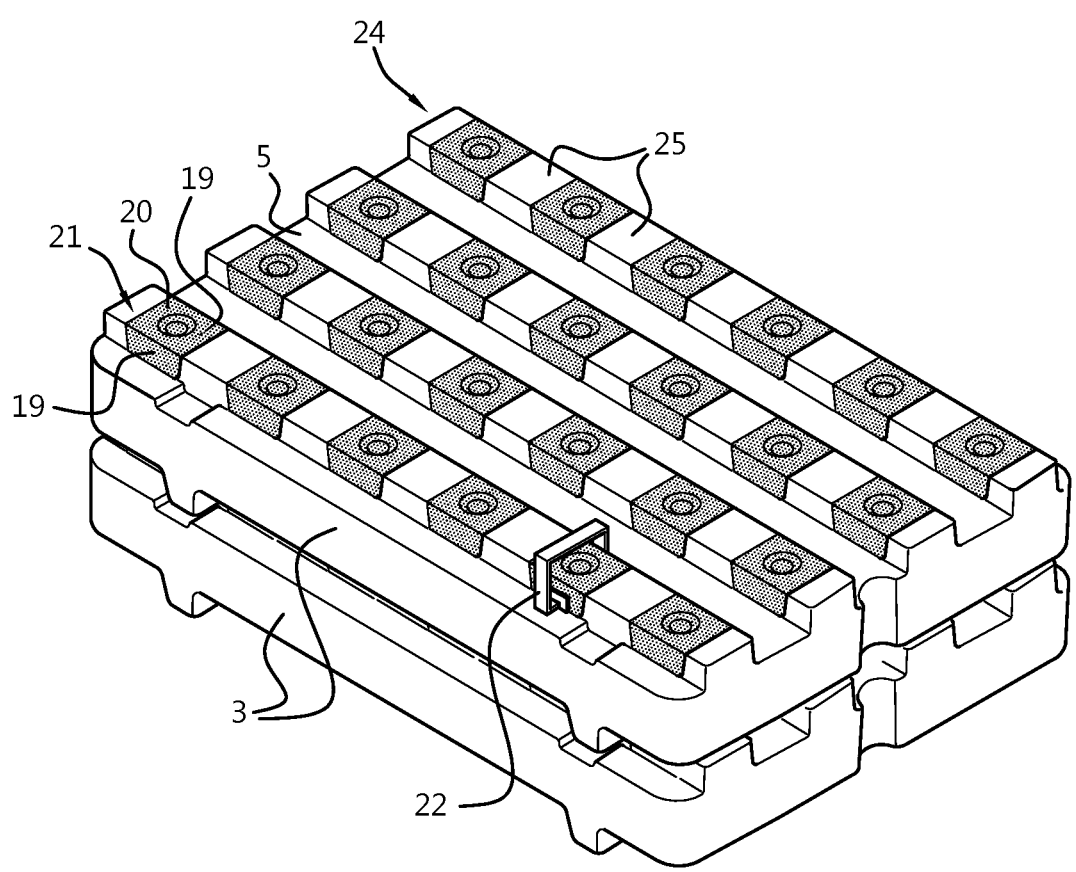
FIG. 8. shows another embodiment of the carrier with the removable side support structure removed from the carrier or float.

FIG. 8. shows another embodiment of the carrier 3 with the removable side support 28 structure removed from the carrier or float 3. The growth media 21 of a row 24 can be clearly seen to have two opposing sides 19 exposed allowing gripping means 22 to engage the growth medium 21 and lift it, along with the plant, out of the aperture 6.

It will be clear that where the term plant is used in the above description, this is also understood to include seeds, cuttings and the like. This means that the above-described plant may be grown from a seed.

Using the method according to the invention, it is also possible to cultivate numerous kinds of plants. Lettuce and chrysanthemums are mentioned by way of example.

After reading the above, those skilled in the art will immediately be able to think of variants which are obvious and fall within the scope of the attached claims. Reference is made in particular to the alternative use for the ordinary cultivation of plants, i.e. without hydroponic cultivation, in a tray or the like. However, the present invention especially provides significant advantages in combination with hydroponic cultivation.

LIST OF REFERENCE NUMERALS

1. Cultivation space
2. Water-filled basin
3. Float or panel
4. Body
5. Upper surface of the panel
6. Aperture in float
7. Chamber
8. Water level
9. Plant
10. Intermediate, tubular space
11. Root neck
12. Roots
13. Container
14. Vertical edge
15. Tube
16. Air roots
17. —
18. Removable side support structure
19. Horizontally opposing side
20. Upper part of growth medium
21. Growth medium
22. Gripping means
23. Assembly of carrier and removable side support structure
24. Row of apertures
25. Upward protrusion
26. Horizontally opposing side in row direction
27. Initial support protrusions
28. Initial support plate
29. Side of removable side support structure
30. Vertical through-hole in removable side support structure

The invention claimed is:

1. A method for the cultivation of a number of plants, comprising providing a carrier with apertures for said plants and providing a water supply, wherein, in a preparatory stage a growth medium is arranged in each of the apertures, wherein for each of the apertures at least two horizontally opposite sides of an upper part of the growth medium are sideways supported along a height by corresponding sides of a removable side support structure, removably arranged on a top side of the carrier, and the roots of a plant of said plants or a precursor thereof is placed in the growth medium, wherein, in a first stage of growth of said plant or the precursor thereof, said carrier is provided above or on said water supply, and said plant or the precursor thereof is positioned at such a distance from said water supply that said roots of said plant or the precursor thereof are situated at a vertical distance from said water supply, at least a significant part of a moisture requirement of said plant or the precursor thereof is satisfied by an intermediate space between said carrier and said water supply and/or by said carrier, wherein said first stage of growth comprises at least a few days, wherein, in a second, further stage of growth of said plant, at least 90% of the moisture requirement of said plant is satisfied directly by said water supply, wherein, after the arranging of the growth medium in the apertures of the carrier, the removable side support structure is removed from the carrier while the growth medium remains supported in the apertures such that for each of the apertures the at least two opposite sides of the upper part of the growth medium are exposed, by the removal of the side support structure, and are grippable sideways to lift the growth medium along with the plant from the aperture for increasing the horizontal distance between said plants, wherein, during the preparatory stage, after the placement of the plant or a precursor thereof in the growth medium, the plant or the precursor thereof is allowed to germinate in a germination room, wherein the removing of the removable side support structure from the top side of the carrier is done before the germination in the germination room.

2. The method according to claim 1, wherein said carrier is provided on said water supply in a floating manner, and wherein the carrier is constructed to float by itself or is provided with a floatable body to facilitate floating.

3. An assembly of a panel-shaped carrier and a removable side support structure, removably arranged on a top side of the carrier, the carrier having apertures for plants, wherein, when seen in top view, the apertures of the carrier are arranged in a pattern comprising a plurality of parallel rows, each row in a row direction having a row length of multiple of said apertures, wherein the carrier comprises upward protrusions which extend upward from the top side of the carrier and are positioned between adjacent apertures in a row to sideways support horizontally opposite sides, opposite in the row direction, of an upper part of a growth medium placed in the apertures, in such a way that the growth medium is sideways supported, and enclosed by, the combination of protrusions and the removable side support structure, wherein each of the apertures in said carrier is adapted to receive the growth medium, either or not containing the roots of a plant or the precursor thereof, in such a manner that for each of the apertures at least two horizontally opposite sides of an upper part of the growth medium are sideways supported along a height by corresponding sides of the removable side support structure when the removable side support structure is arranged on said top side, and such that when the removable side support structure is removed from the top side, the growth medium remains supported in each aperture, with the upward protrusions providing sideways support to the horizontally opposite sides, with said opposite sides of the growth medium exposed and grippable sideways.

4. The assembly according to claim 3, wherein, in top view, the removable support structure has a shape and outer dimensions identical to the shape and outer dimensions of the carrier.

5. The assembly according to claim 3, when seen in top view, the apertures of the carrier are arranged in a pattern of parallel rows, each row in a row direction, having a row length of multiple apertures.

6. The assembly according to claim 3, wherein the removable side support structure is formed as one integral element.

7. The assembly according to claim 3, wherein the removable side support structure has a plate-like shape.

8. The assembly according to claim 3, wherein, when seen in top view, the removable side support structure has a pattern of apertures in the form of through-holes matching the pattern of the apertures of the carrier, the through-holes having a vertical through-hole length at least equal to the height.

9. The assembly according to claim 3, wherein the growth medium is placed in the apertures.

10. The assembly according to claim 9, wherein the growth medium is self-adhesive.

11. A system comprising a water supply, filled with water, wherein an assembly according to claim 3, is provided on or above said water supply, wherein in each of the apertures a growth medium containing the roots of a plant or the precursor thereof is placed, wherein in a first stage of growth the plant or the precursor thereof is positioned at such a distance from said water supply that said roots of said plant or the precursor thereof are situated at a vertical distance from said water supply, wherein at least a significant part of a moisture requirement of said plant or the precursor thereof is satisfied by an intermediate space between said carrier and said water supply and/or by said carrier.

12. The system according to claim 11, wherein the removable side support structure is removed from the assembly before a second stage of growth of the plant or the precursor thereof, such that the at least two opposite sides of the upper part of the growth medium are exposed, and the growth medium is grippable sideways at the opposite sides by gripping means to lift the growth medium along with the plant from the aperture, wherein in said second stage of growth of said plant, at least 90% of a moisture requirement of said plant is satisfied directly by a water supply.

13. The system according to claim 11, wherein the removable side support structure is removed before the plant or the precursor thereof is placed in the growth medium, and wherein the growth medium itself has sufficient cohesive strength to be able to go without the removable side support structure.

14. The assembly according to claim 3, wherein the panel-shaped carrier is adapted for floating on a body of water and comprises a number of chambers on its bottom side, which are gas-tight towards the top side of the carrier and open towards the bottom of the carrier.

* * * * *